United States Patent
Mimura

(10) Patent No.: US 11,447,115 B2
(45) Date of Patent: Sep. 20, 2022

(54) BRAKE FLUID PRESSURE CONTROL DEVICE

(71) Applicant: Robert Bosch GmbH, Stuttgart (DE)

(72) Inventor: Takeshi Mimura, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 16/978,804

(22) PCT Filed: Feb. 26, 2019

(86) PCT No.: PCT/IB2019/051522
§ 371 (c)(1),
(2) Date: Sep. 8, 2020

(87) PCT Pub. No.: WO2019/171206
PCT Pub. Date: Sep. 12, 2019

(65) Prior Publication Data
US 2020/0406881 A1 Dec. 31, 2020

(30) Foreign Application Priority Data

Mar. 5, 2018 (JP) .............................. JP2018-038195

(51) Int. Cl.
*B60T 8/36* (2006.01)
*B60T 13/68* (2006.01)
(Continued)

(52) U.S. Cl.
CPC .......... *B60T 13/686* (2013.01); *B60T 13/165* (2013.01); *B60T 13/58* (2013.01); *B60T 15/028* (2013.01);
(Continued)

(58) Field of Classification Search
CPC ...... B60T 8/368; B60T 8/3675; B60T 8/3685; B60T 13/686; B60T 8/363; B60T 17/02; Y10S 303/10
(Continued)

(56) References Cited

U.S. PATENT DOCUMENTS 5,887,851 A * 3/1999 Trzmiel .............. F15B 13/0821
29/605
6,234,199 B1 5/2001 Nohira
(Continued)

FOREIGN PATENT DOCUMENTS

DE 4020448 A * 1/1992 .............. B60T 11/22
DE 19621230 A1 * 11/1997 ............ B60T 13/686
(Continued)

OTHER PUBLICATIONS

International Search Report for Application No. PCT/IB2019/051522 dated May 22, 2019 (English Translation, 2 pages).

*Primary Examiner* — Robert A. Siconolfi
*Assistant Examiner* — Stephen M Bowes
(74) *Attorney, Agent, or Firm* — Michael Best & Friedrich LLP

(57) ABSTRACT

[Problem] The present invention provides a brake hydraulic pressure controller capable of suppressing vibrations of the brake hydraulic pressure controller by lowering a position of center of gravity of the brake hydraulic pressure controller at the time of being mounted on a vehicle.
[Means for Resolution] A brake hydraulic pressure controller for a four-wheeled motor vehicle that controls a hydraulic pressure of a brake hydraulic circuit includes: a housing; a motor mounted on a first surface of the housing; and plural electromagnetic control valves mounted on a second surface that opposes the first surface of the housing. The plural electromagnetic control valves are arranged in plural rows from a near side to a far side from a third surface that
(Continued)

continues perpendicularly from both of the first surface and the second surface. Two circuit control valves and four booster regulators are arranged in the same row. The two circuit control valves are arranged in channels that connect piping ports, to which piping connected to a master cylinder is connected, and discharge sides of pumps driven by the motor. The four booster regulators are arranged in channels that connect the circuit control valves and piping ports, to which piping connected to wheel cylinders is connected.

12 Claims, 5 Drawing Sheets

(51) Int. Cl.
    *B60T 13/16*         (2006.01)
    *B60T 13/58*         (2006.01)
    *B60T 15/02*         (2006.01)
    *B60T 17/04*         (2006.01)
    *B60T 17/22*         (2006.01)
    *B60T 13/14*         (2006.01)

(52) U.S. Cl.
    CPC ............ *B60T 17/04* (2013.01); *B60T 17/221* (2013.01); *B60T 13/145* (2013.01); *B60T 2270/402* (2013.01); *B60T 2270/88* (2013.01)

(58) Field of Classification Search
    USPC ................................................... 303/DIG. 10
    See application file for complete search history.

(56) References Cited

U.S. PATENT DOCUMENTS

| | | | |
|---|---|---|---|
| 2002/0096938 A1* | 7/2002 | Wojciechowski | .. F15B 13/0832 335/2 |
| 2010/0276925 A1 | 11/2010 | Bareiss et al. | |
| 2017/0274883 A1 | 9/2017 | Kim | |
| 2017/0282879 A1* | 10/2017 | Matsunaga | ............. B60T 15/36 |

FOREIGN PATENT DOCUMENTS

| | | | | |
|---|---|---|---|---|
| DE | 102016214329 | | 2/2018 | |
| DE | 102016214329 A1 | * | 2/2018 | |
| FR | 2826425 A1 | * | 12/2002 | ............. B60T 17/04 |
| JP | 2005145239 | | 6/2005 | |
| JP | 2016203880 | | 12/2016 | |
| WO | WO-2015016302 A1 | * | 2/2015 | ............. B60T 8/368 |
| WO | WO-2019220231 A | * | 11/2019 | ............. B60T 8/368 |

\* cited by examiner

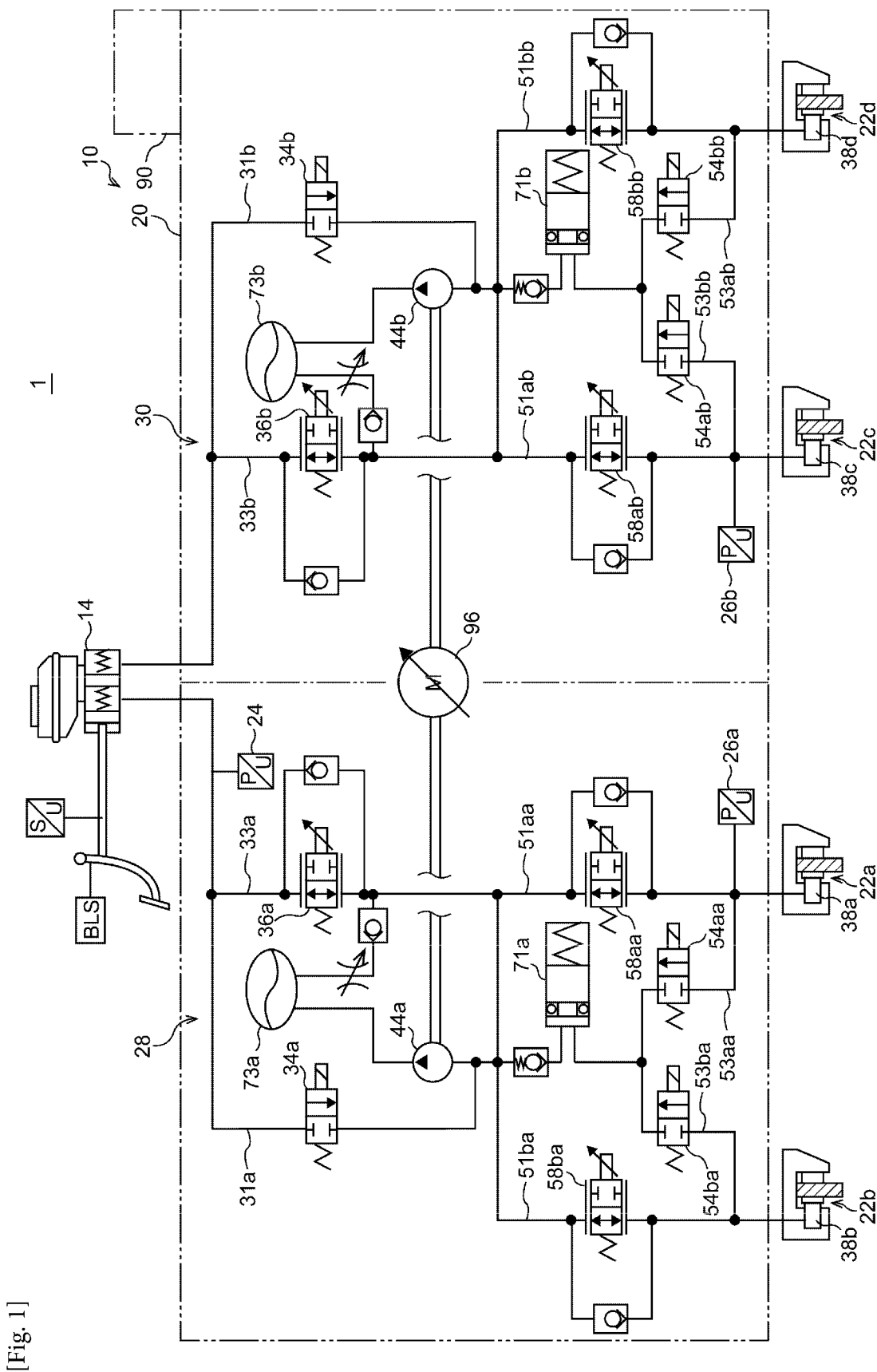
[Fig. 1]

[Fig. 2]
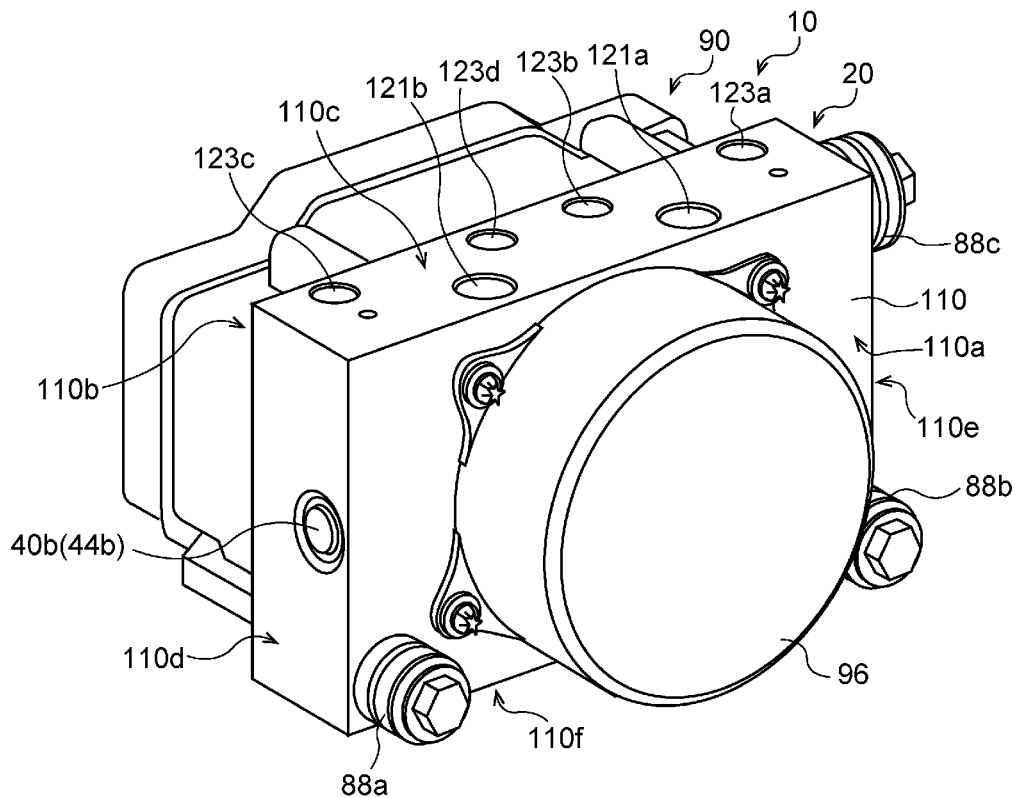
[Fig. 3]
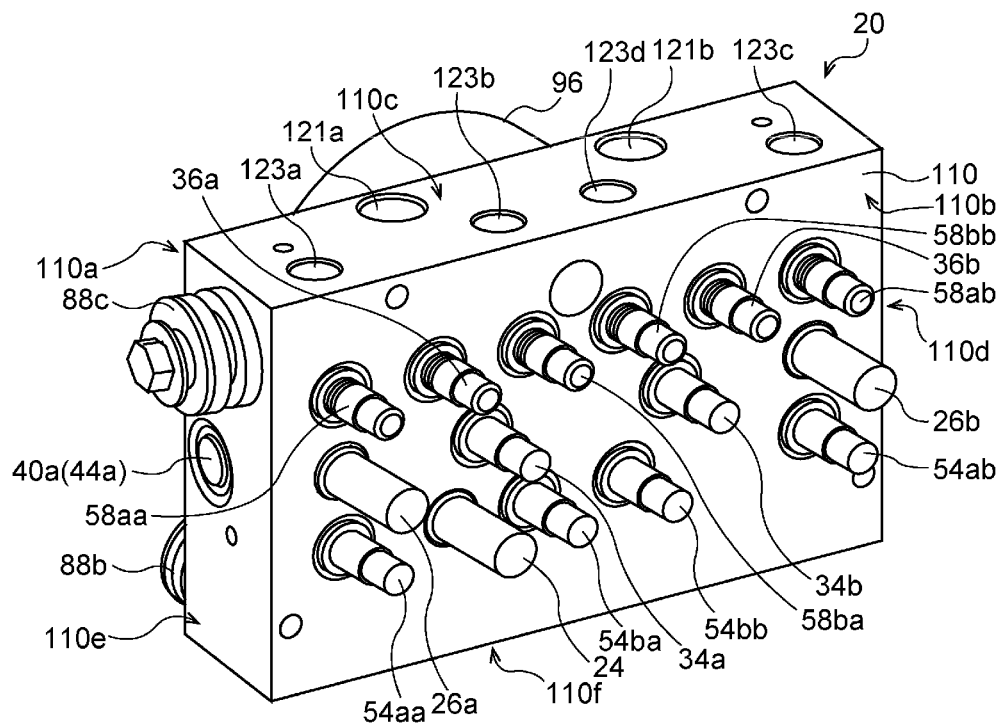

[Fig. 4]
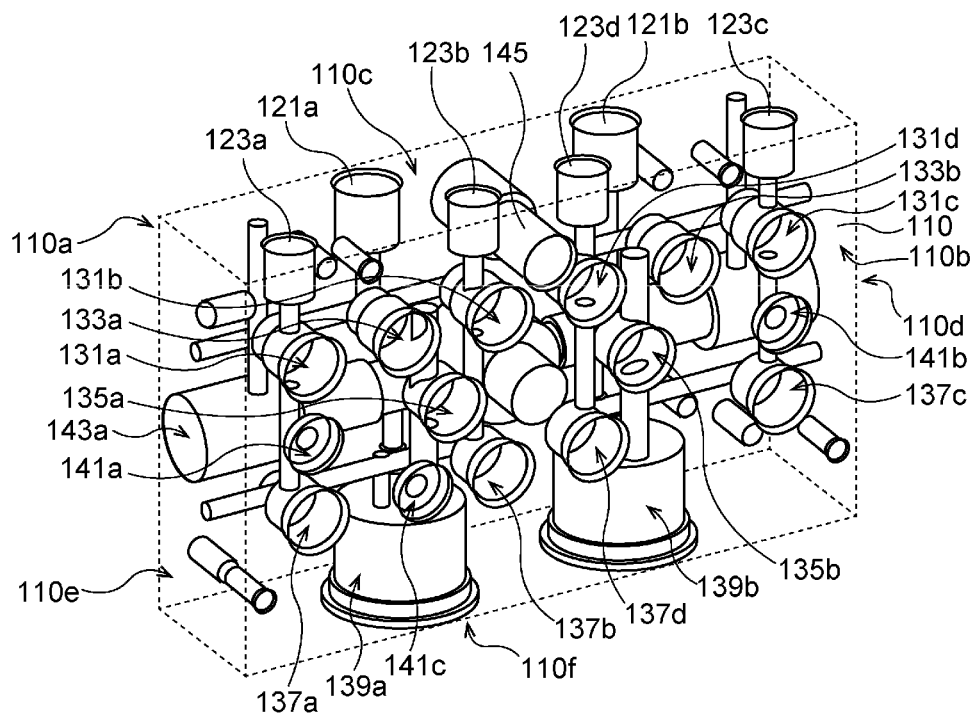
[Fig. 5]
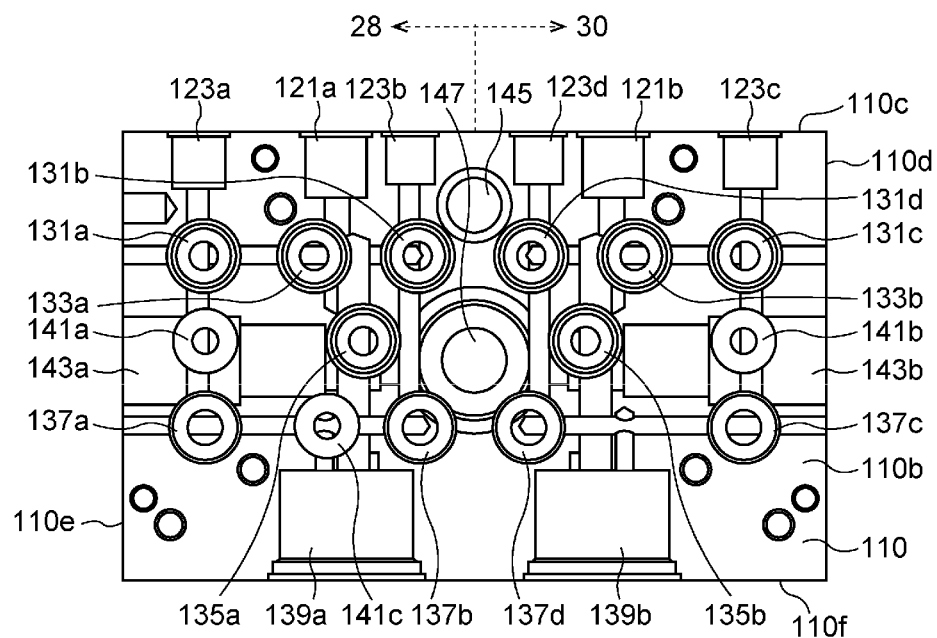

[Fig. 6]
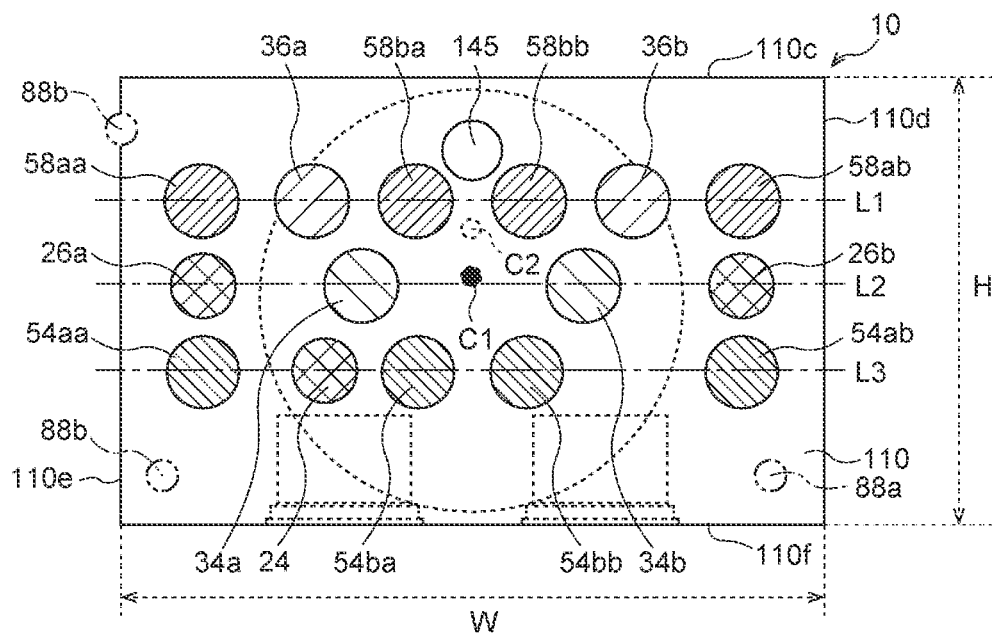
[Fig. 7]
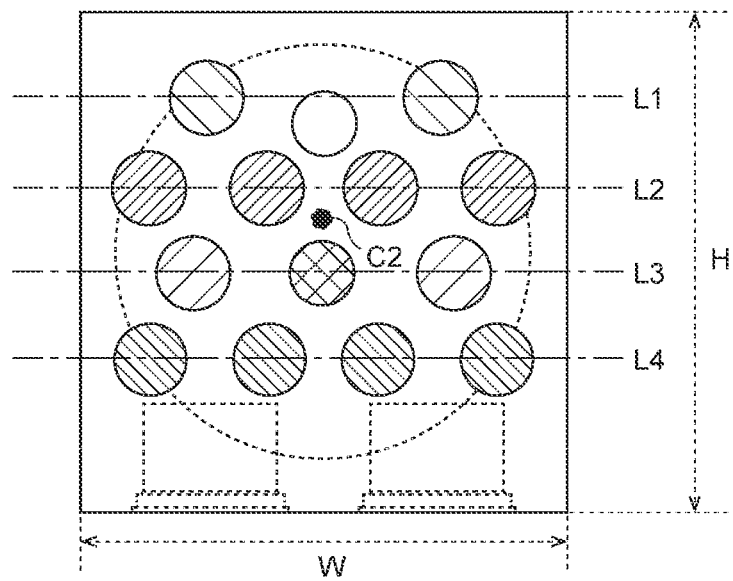
Prior Art

[Fig. 8]
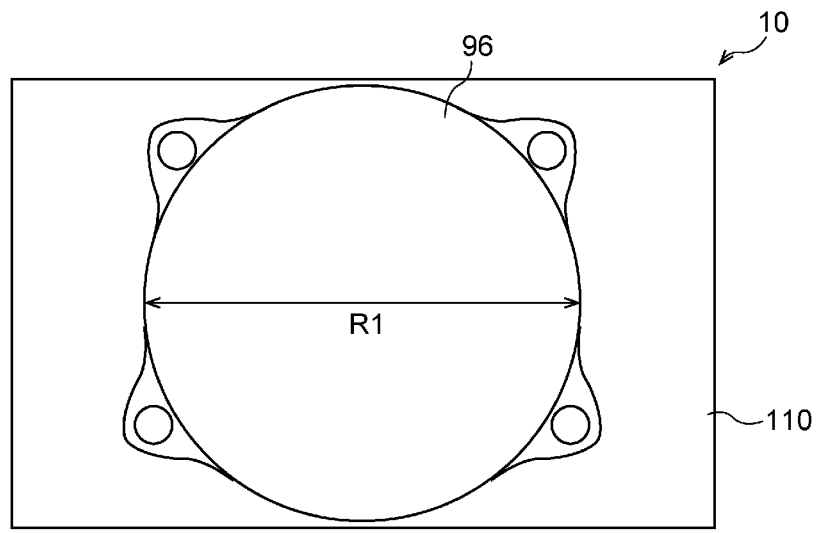
[Fig. 9]
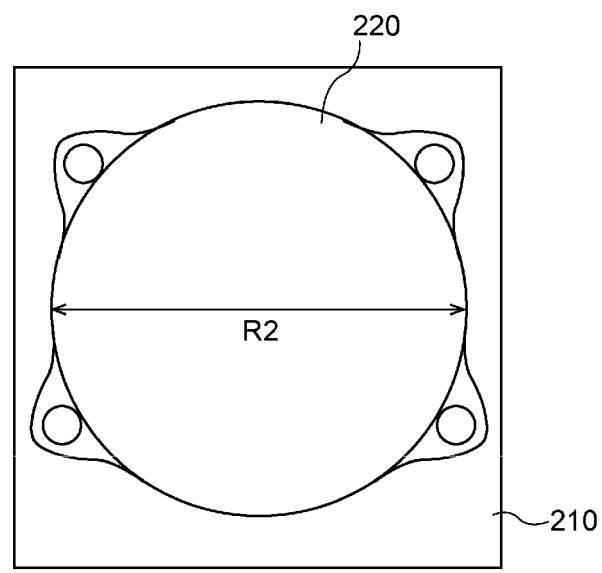

BRAKE FLUID PRESSURE CONTROL DEVICE

BACKGROUND OF THE INVENTION

The present invention relates to a brake hydraulic pressure controller.

Conventionally, a brake hydraulic pressure controller that executes brake control by controlling a hydraulic pressure of a brake fluid to be supplied to a braking section in a hydraulic circuit has been known. The brake hydraulic pressure controller includes a hydraulic unit and an electronic control unit (ECU).

The hydraulic unit includes plural electromagnetic control valves, a pump, a motor for driving the pump, and the like. These plural electromagnetic control valves and the motor are operated under control by the ECU. When the hydraulic pressure in the brake hydraulic circuit is increased or reduced, a braking force generated in a wheel is controlled (for example, see JP-A-2016-203880).

The plural electromagnetic control valves are mounted on a surface of a housing. The surface opposes a surface to which the motor is attached. In addition, at least a part of a piping port, to which piping is connected, is formed in a surface which perpendicularly continues from both of the mounting surface of the motor and the mounting surface of the plural electromagnetic control valves in the housing. The plural electromagnetic control valves are arranged in plural rows from a near side to a far side from the surface to which the piping port is formed.

The brake hydraulic pressure controller mounted on a four-wheeled motor vehicle usually includes the 12 electromagnetic control valves. In general, the plural electromagnetic control valves are mounted on the single surface of the housing such that a maximum of the four electromagnetic control valves are arranged in the single row (for example, see JP-A-2005-145239). Lengths in two directions of the single surface, on which the plural electromagnetic control valves are mounted, in the housing are set in accordance with such arrangement of the plural electromagnetic control valves.

SUMMARY OF THE INVENTION

When the brake hydraulic pressure controller is mounted on the vehicle, the brake hydraulic pressure controller is usually mounted such that the mounting surface of the motor and the mounting surface of the plural electromagnetic control valves face a lateral direction while the surface in which at least the part of the piping port is formed faces upward. In the cases where the number of the electromagnetic control valves arranged in the single row is set to be the maximum of four as in the conventional brake hydraulic pressure controller and where the surface formed with the piping port is set as an upper surface, it is difficult to reduce size of the housing in a height direction. Thus, center of gravity of the brake hydraulic pressure controller is located high, and the brake hydraulic pressure controller tends to be unbalanced at the time of being mounted on the vehicle. As a result, the brake hydraulic pressure controller is likely to vibrate, and sound and vibration properties are possibly deteriorated. Meanwhile, there is a case where a yaw rate sensor and an acceleration sensor are mounted on the ECU of the brake hydraulic pressure controller. In such a case, when the brake hydraulic pressure controller tends to vibrate, sensing properties of these sensors are possibly deteriorated.

The present invention has been made in view of the above problem and therefore provides a brake hydraulic pressure controller capable of suppressing vibrations of the brake hydraulic pressure controller by lowering a position of center of gravity of the brake hydraulic pressure controller at the time of being mounted on a vehicle.

According to one aspect of the present invention, a brake hydraulic pressure controller for a four-wheeled motor vehicle that controls a hydraulic pressure in a brake hydraulic circuit is provided. The brake hydraulic pressure controller includes: a housing; a motor mounted on a first surface of the housing; and plural electromagnetic control valves mounted on a second surface that opposes the first surface of the housing. The plural electromagnetic control valves are arranged in plural rows from a near side to a far side from a third surface that continues perpendicularly from both of the first surface and the second surface. Two circuit control valves and four booster regulators are arranged in the same row. The two circuit control valves are arranged in channels that connect piping ports, to which piping connected to a master cylinder is connected, and discharge sides of pumps driven by the motor. The four booster regulators are arranged in channels that connect the circuit control valves and piping ports, to which piping connected to wheel cylinders is connected.

As it has been described so far, according to the present invention, vibrations of the brake hydraulic pressure controller can be suppressed by lowering a position of center of gravity of the brake hydraulic pressure controller at the time of being mounted on the vehicle.

BRIEF DESCRIPTION OF THE DRAWINGS

FIG. 1 is a circuit diagram of a configuration example of a brake hydraulic circuit to which a brake hydraulic pressure controller according to an embodiment of the present invention can be applied.

FIG. 2 is a perspective view in which the brake hydraulic pressure controller according to the embodiment is seen from a side of an attachment surface of a motor.

FIG. 3 is a perspective view in which the brake hydraulic pressure controller according to the embodiment is seen from a side of an attachment surface of an ECU.

FIG. 4 is a perspective view in which an internal configuration of a housing according to the embodiment is indicated by solid lines.

FIG. 5 is a front view of the housing according to the embodiment.

FIG. 6 is an explanatory view illustrating arrangement of plural electromagnetic control valves in the brake hydraulic pressure controller according to the embodiment.

FIG. 7 is an explanatory view illustrating a brake hydraulic pressure controller according to a reference example.

FIG. 8 is an explanatory view illustrating size of the motor that can be used for the brake hydraulic pressure controller according to the embodiment.

FIG. 9 is an explanatory view illustrating size of a motor that can be used for the brake hydraulic pressure controller according to the reference example.

DETAILED DESCRIPTION

A detailed description will hereinafter be made on a preferred embodiment of the present invention with reference to the accompanying drawings. In this specification and the drawings, components that have substantially the same functional configurations will be denoted by the same reference signs, and thus a description thereon will not be repeated.

<1. Brake Hydraulic Circuit>

Referring to FIG. 1, a brief description will be made on a brake hydraulic circuit 1 to which a brake hydraulic pressure controller 10 according to this embodiment can be applied.

The brake hydraulic circuit 1 illustrated in FIG. 1 is a hydraulic circuit in a brake system for a four-wheeled motor vehicle. Such a brake hydraulic circuit 1 is applied to a brake system that increases a depression force of a brake pedal by a driver without using a booster and transmits the increased depression force to a wheel cylinder. However, the booster may be used in an example of the brake system herein.

The brake hydraulic circuit 1 includes a first hydraulic circuit 28 and a second hydraulic circuit 30, both of which have the same configuration as each other. A brake fluid is supplied from a master cylinder 14 to each of the first hydraulic circuit 28 and the second hydraulic circuit 30.

The brake hydraulic circuit 1 is configured as of a so-called X-shaped piping type in which each of the first hydraulic circuit 28 and the second hydraulic circuit 30 controls a hydraulic pressure of a pair of a front wheel and a rear wheel at diagonal positions in the vehicle. Note that the brake system is not limited to that of the X-shaped piping type.

The second hydraulic circuit 30 has the same configuration as the first hydraulic circuit 28. A brief description will hereinafter be made on the first hydraulic circuit 28, and a description on the second hydraulic circuit 30 will not be made.

The first hydraulic circuit 28 includes a pump element 44a that is driven by a motor 96. The first hydraulic circuit 28 also includes an accumulator 71a and a damper 73a.

The pump 44a is driven by the motor 96 and discharges the brake fluid. Driving of the motor 96 is controlled by an ECU 90. The number of the pump 44a provided in the first hydraulic circuit 28 is not limited to one.

A first pressure sensor 24 is provided in a pipeline that communicates with the master cylinder 14. The first pressure sensor 24 detects an internal pressure of the master cylinder 14.

A second pressure sensor 26a is provided in a pipeline that communicates with a wheel cylinder 38a in a hydraulic brake 22a of a front right wheel. The second pressure sensor 26a detects an internal pressure of the wheel cylinder 38a.

The second pressure sensor 26a may be provided in a pipeline that communicates with a wheel cylinder 38b in a hydraulic brake 22b of a rear left wheel, and may detect an internal pressure of the wheel cylinder 38b.

The first hydraulic circuit 28 includes plural electromagnetic control valves. The plural electromagnetic control valves include: a circuit control valve 36a of a normally closed type that can be controlled linearly; a suction control valve 34a of a normally closed type that is subjected to on/off control; booster regulators 58aa, 58ba, each of which is of a normally open type and can be controlled linearly; and pressure regulators 54aa, 54ba, each of which is of the normally closed type and is subjected to the on/off control.

The circuit control valve 36a is arranged in a channel 33a that connects the master cylinder 14 and a discharge side of the pump 44a. The circuit control valve 36a can be controlled linearly and continuously regulates a channel area between the master cylinder 14 and each of the booster regulators 58aa, 58ba.

The suction control valve 34a is arranged in a channel 31a that connects the master cylinder 14 and a suction side of the pump 44a. The suction control valve 34a communicates or blocks between the master cylinder 14 and the suction side of the pump 44a.

The booster regulators 58aa, 58ba are respectively arranged in channels 51aa, 51ba, each of which connect the circuit control valve 36a and corresponding one of the wheel cylinders 38a, 38b. The booster regulators 58aa, 58ba can be controlled linearly, and continuously regulate a flow rate of hydraulic oil from a side of the master cylinder 14 and the circuit control valve 36a to the wheel cylinder 38a side of the hydraulic brake 22a of the front right wheel and the wheel cylinder 38b side of the hydraulic brake 22b of the rear left wheel, respectively.

The pressure regulators 54aa, 54ba are respectively arranged in channels 53aa, 53ba, each of which connects the suction side of the pump 44a and corresponding one of the wheel cylinder 38a, 38b. Each of the pressure regulators 54aa, 54ba communicates or blocks between the suction side of the pump 44a and corresponding one of the wheel cylinder 38a, 38b. The pressure regulators 54aa, 54ba in open states supply the hydraulic oil that has been supplied to the wheel cylinders 38a, 38b in the hydraulic brakes 22a, 22b of the front right wheel and the rear left wheel to the accumulator 71a and thereby reduces the hydraulic pressures. When opening/closing of each of the pressure regulators 54aa, 54ba is intermittently repeated, the flow rate of the hydraulic oil flowing from each of the wheel cylinders 38a, 38b to the accumulator 71a can be regulated.

The ECU 90 controls driving of these electromagnetic control valves. Each of the electromagnetic control valves may be of the normally open type or the normally closed type.

The second hydraulic circuit 30 controls a hydraulic brake 22c of a front left wheel and a hydraulic brake 22d of a rear right wheel. The second hydraulic circuit 30 is configured in a similar manner to the first hydraulic circuit 28 except for points that the wheel cylinder 38a in the hydraulic brake 22a of the front right wheel in the above description on the first hydraulic circuit 28 is replaced with a wheel cylinder 38c in the hydraulic brake 22c of the front left wheel and that the wheel cylinder 38b in the hydraulic brake 22b of the rear left wheel is replaced with a wheel cylinder 38d in the hydraulic brake 22d of the rear right wheel.

<2. Brake Hydraulic Pressure Controller>

(2-1. Overall Configuration)

A description will be made on an overall configuration of the brake hydraulic pressure controller 10 according to this embodiment with reference to FIG. 2 and FIG. 3.

FIG. 2 is a perspective view in which the brake hydraulic pressure controller 10 is seen from an attachment surface side of the motor 96. FIG. 3 is a perspective view in which the brake hydraulic pressure controller 10 is seen from an attachment surface side of the ECU 90. In FIG. 3, the ECU 90 is not illustrated.

The illustrated brake hydraulic pressure controller 10 is an apparatus for controlling a braking force on each of the wheels of the four-wheeled motor vehicle. The brake hydraulic pressure controller 10 includes a hydraulic unit 20 and the ECU 90. The hydraulic unit 20 is formed with the brake hydraulic circuit 1 illustrated in FIG. 1.

The hydraulic unit 20 includes a housing 110. The motor 96 for driving the pumps 44a, 44b is mounted on a first surface 110a of the housing 110. The motor 96 is mounted such that an unillustrated motor shaft 96a is directed inward in the housing 110.

The ECU 90 is attached to a second surface 110b that opposes the first surface 110a of the housing 110. The 12 electromagnetic control valves and the 3 pressure sensors are mounted on this second surface 110b. The ECU 90 is attached to the second surface 110b in a manner to cover these electromagnetic control valves and these pressure sensors. The 12 electromagnetic control valves and the 3 pressure sensors are electrically connected to the ECU 90.

The 12 electromagnetic control valves include the 2 circuit control valves 36a, 36b, the 2 suction control valves 34a, 34b, the 4 booster regulators 58aa, 58ba, 58ab, 58bb, and the 4 pressure regulators 54aa, 54ba, 54ab, 54bb. The three pressure sensors include the one first pressure sensor 24 and the two second pressure sensors 26a, 26b.

Of four surfaces 110c, 110d, 110e, 110f, each of which continues perpendicularly from both of the first surface 110a and the second surface 110b, the third surface 110c is formed with six piping ports, to each of which piping is connected. The six piping ports include: two piping ports 121a, 121b, to each of which the piping connected to the master cylinder is connected; and four piping ports 123a, 123b, 123c, 123d, to each of which the piping connected to the wheel cylinder is connected.

On the fourth surface 110d and the fifth surface 110e, each of which continues perpendicularly from the first surface 110a, the second surface 110b, and the third surface 110c, pump elements 40a, 40b, which respectively include the pumps 44a, 44b, are attached, respectively. Each of the pumps 44a, 44b has a piston that reciprocates in conjunction with rotation of the motor shaft in the motor 96, so as to suction or discharge the brake fluid.

The sixth surface 110f, which continues perpendicularly from the first surface 110a and the second surface 110b and opposes the third surface 110c, is provided with the unillustrated accumulators.

Support members 88a, 88b, 88c, each of which has a damper function, are fixed to the first surface 110a and the fifth surface 110e. An unillustrated bracket, which is used to attach the brake hydraulic pressure controller 10 to a vehicle body, is attached to each of the support members 88a, 88b, 88c, the brake hydraulic pressure controller 10 is mounted on the vehicle body via such brackets.

Note that positions where the support members 88a, 88b, 88c are fixed are not limited to the illustrated positions.

(2-2. Configuration of Housing)

FIG. 4 and FIG. 5 are explanatory views, each of which illustrates a configuration example of the housing 110 of the hydraulic unit 20. FIG. 4 is a perspective view in which an internal configuration of the housing 110 is indicated by solid lines, and FIG. 5 is a front view of the housing 110 illustrated in FIG. 4.

The housing 110 is made of light metal such as aluminum or metal, for example. The housing 110 is formed with internal channels as the channels for the brake fluid. In addition, the housing 110 has plural attachment sections in which the motor, the two pump elements, the plural electromagnetic control valves, the accumulators, the pressure sensors, and the like are arranged. Each of the attachment sections is a columnar recess that is formed in the housing 110 by boring, for example.

In the housing 110 illustrated in FIG. 5, the internal channels or the attachment sections forming the first hydraulic circuit 28 are provided in a left-half portion, and the internal channels or the attachment sections forming the second hydraulic circuit 30 are provided in a right-half portion.

The housing 110 has plural piping ports 121a, 121b, 123a, 123b, 123c, 123d as the attachment sections on the third surface 110c. The piping that connects the master cylinder 14 and the first hydraulic circuit 28 is connected to the piping port 121a. The piping that connects the master cylinder 14 and the second hydraulic circuit 30 is connected to the piping port 121b.

The piping that is connected to the wheel cylinder 38a in the hydraulic brake 22a of the front right wheel is connected to the piping port 123a. The piping that is connected to the wheel cylinder 38b in the hydraulic brake 22b of the rear left wheel is connected to the piping port 123b. The piping that is connected to the wheel cylinder 38c in the hydraulic brake 22c of the front left wheel is connected to the piping port 123c. The piping that is connected to the wheel cylinder 38d in the hydraulic brake 22d of the rear right wheel is connected to the piping port 123d.

The housing 110 has pump mounting sections 143a, 143b as the attachment sections in the fifth surface 110e and the fourth surface 110d, respectively. The pump element 40a is mounted on the pump mounting section 143a of the fifth surface 110e. The pump element 40b is mounted on the pump mounting section 143b of the fourth surface 110d.

The housing 110 has accumulator bores 139a, 139b as the attachment sections on the sixth surface 110f. The accumulators 71a, 71b are respectively assembled into the accumulator bores 139a, 139b.

The housing 110 has a motor mounting section 147 as the attachment section on the first surface 110a. The motor 96 is mounted on the motor mounting section 147. The housing 110 also has a through-hole 145 that penetrates from the first surface 110a side to the second surface 110b side. Electric wiring that connects the motor 96 and the ECU 90, and the like are disposed in the through-hole 145.

The housing 110 has valve mounting sections 131a to 131d, 133a to 133b, 135a to 135b, 137a to 137d, on each of which one of the plural electromagnetic control valves is mounted, as the attachment sections on the second surface 110b.

The booster regulator 58aa, which supplies the brake fluid to the wheel cylinder 38a in the hydraulic brake 22a of the front right wheel, is mounted on the valve mounting section 131a. The booster regulator 58ba, which supplies the brake fluid to the wheel cylinder 38b in the hydraulic brake 22b of the rear left wheel, is mounted on the valve mounting section 131b. The booster regulator 58ab, which supplies the brake fluid to the wheel cylinder 38c in the hydraulic brake 22c of the front left wheel, is mounted on the valve mounting section 131c. The booster regulator 58bb, which supplies the brake fluid to the wheel cylinder 38d in the hydraulic brake 22d of the rear right wheel, is mounted on the valve mounting section 131d.

The circuit control valve 36a in the first hydraulic circuit 28 is mounted on the valve mounting section 133a. The circuit control valve 36b in the second hydraulic circuit 30 is mounted on the valve mounting section 133b. The suction control valve 34a in the first hydraulic circuit 28 is mounted on the valve mounting section 135a. The suction control valve 34b in the second hydraulic circuit 30 is mounted on the valve mounting section 135b.

The pressure regulator 54aa, which discharges the brake fluid from the wheel cylinder 38a in the hydraulic brake 22a of the front right wheel, is mounted on the valve mounting section 137a. The pressure regulator 54ba, which discharges the brake fluid from the wheel cylinder 38b in the hydraulic brake 22b of the rear left wheel, is mounted on the valve mounting section 137b. The pressure regulator 54ab, which discharges the brake fluid from the wheel cylinder 38c in the hydraulic brake 22c of the front left wheel, is mounted on the valve mounting section 137c. The pressure regulator 54bb, which discharges the brake fluid from the wheel cylinder 38d in the hydraulic brake 22d of the rear right wheel, is mounted on the valve mounting section 137d.

The housing 110 further has sensor mounting sections 141a to 141c, on each of which one of the plural pressure sensors is mounted, as the attachment sections on the second surface 110b.

The second pressure sensor 26a, which detects the internal pressure of the wheel cylinder 38a in the hydraulic brake 22a of the front right wheel, is mounted on the sensor mounting section 141a. The second pressure sensor 26b, which detects an internal pressure of the wheel cylinder 38c in the hydraulic brake 22c of the front left wheel, is mounted on the sensor mounting section 141b. The first pressure sensor 24, which detects the internal pressure of the master cylinder 14, is mounted on the sensor mounting section 141c.

(2-3. Arrangement of Electromagnetic Control Valves)

FIG. 6 is an explanatory view illustrating arrangement of the plural electromagnetic control valves in the brake hydraulic pressure controller 10 according to this embodiment.

On the second surface 110b, the plural electromagnetic control valves are separately arranged in a first row L1 to a third row L3 from a near side to a far side from the third surface 110c. In the first row L1, a total of the six electromagnetic control valves including the four booster regulators 58aa, 58ba, 58ab, 58bb and the two circuit control valves 36a, 36b is arranged.

In the second row L2, the two suction control valves 34a, 34b and the two second pressure sensors 26a, 26b are arranged. In the third row L3, the fourth pressure regulators 54aa, 54ba, 54ab, 54bb and the first pressure sensor 24 are arranged.

In the brake hydraulic pressure controller 10 according to this embodiment, the six electromagnetic control valves are arranged in the first row L1. In this way, a total of the 12 electromagnetic control valves and the 3 pressure sensors are arranged in the 3 rows. As a result, a distance H between the third surface 110c and the sixth surface 110f becomes shorter than a distance W between the fourth surface 110d and the fifth surface 110e. The brake hydraulic pressure controller 10 is usually mounted on the vehicle such that the third surface 110c formed with the piping ports is located on an upper side. Thus, the height (H) of the brake hydraulic pressure controller 10 is less than the width (W) thereof.

FIG. 7 illustrates a reference example of a brake hydraulic pressure controller in which a maximum of the four electromagnetic control valves is arranged in a single row. In the reference example, the two suction control valves are arranged in the first row L1, and the fourth booster regulators are arranged in the second row L2. In addition, the two circuit control valves and the one pressure sensor are arranged in the third row L3, and the four pressure regulators are arranged in the fourth row L4.

In the brake hydraulic pressure controller according to the reference example, the maximum of the four electromagnetic control valves is arranged in the single row. Thus, the total of the 12 electromagnetic control valves and the single pressure sensor are arranged in the 4 rows. As a result, while the width (W) of the brake hydraulic pressure controller is reduced, the height (H) thereof is increased. Thus, center of gravity C2 of the brake hydraulic pressure controller is located relatively high.

Meanwhile, as illustrated in FIG. 6, in regard to the brake hydraulic pressure controller 10 according to this embodiment, center of gravity C1 of the brake hydraulic pressure controller 10, to which the motor 96, the ECU 90, the pump elements 40a, 40b, and the like are assembled, is located relatively low. Thus, the brake hydraulic pressure controller 10, which is fixed to the brackets via the support members 88a to 88c, can stably be supported. As a result, vibrations of the brake hydraulic pressure controller 10 are suppressed, and sound and vibration properties are improved.

There is a case where the ECU 90 in the brake hydraulic pressure controller 10 includes a yaw rate sensor or an acceleration sensor that is used for brake control such as an electronic stability program (ESP). Since the vibrations of the brake hydraulic pressure controller 10 according to this embodiment are suppressed, a sensing property of each of these yaw rate sensor and acceleration sensor is improved.

A length in a width (W) direction of the brake hydraulic pressure controller 10 according to this embodiment is increased. Thus, a diameter of the motor 96 to be used can be increased. FIG. 8 and FIG. 9 are explanatory views illustrating size of the motors that can be used in the brake hydraulic pressure controller 10 according to this embodiment and the brake hydraulic pressure controller according to the reference example, respectively.

As described above, the housing 110 is formed with the internal channels, the piping ports, and the various attachment sections. In order to suppress a weight increase of the housing 110, the housing 110 is desirably formed as small as possible. Thus, a position of a screw or the like used to fix the motor is often restricted.

In the case of the brake hydraulic pressure controller according to the reference example illustrated in FIG. 9, a space is available in a vertical (height) direction of a housing 210 with respect to arrangement of a motor 220, but no space is provided in a lateral (width) direction. On the contrary, in the case of the brake hydraulic pressure controller 10 according to this embodiment illustrated in FIG. 8, a space in a lateral (width) direction of the housing 110 can effectively be used. Thus, a diameter R1 of the motor 96 to be mounted can be larger than a diameter R2 of the motor 220 in the reference example.

Also, in the brake hydraulic pressure controller according to the reference example, the diameter R2 of the motor 220 to be used can be increased by increasing a lateral width of the housing 210. However, an increased space becomes a dead space and increases mass of the housing 210. Thus, such an increase is not preferred.

As described above, in the brake hydraulic pressure controller 10 according to this embodiment, the diameter R1 of the motor 96 that can be mounted can be increased. Thus, in the case where output of the motor 96 is set to be the same, an axial length of the motor 96 can be reduced. As a result, the position of the center of gravity C1 of the brake hydraulic pressure controller 10 becomes close to a center of a fixed position of the brake hydraulic pressure controller 10. In this way, the brake hydraulic pressure controller 10 can stably be supported.

In the brake hydraulic pressure controller 10 according to this embodiment, the circuit control valve 36a, which is arranged in the first row L1, is arranged between the two booster regulators 58aa, 58ba in the first hydraulic circuit 28 of the brake hydraulic circuit 1. Similarly, in the second hydraulic circuit 30, the circuit control valve 36b, which is arranged in the first row L1, is arranged between the two booster regulators 58ab, 58bb.

Since the circuit control valves 36a, 36b are respectively arranged between the two booster regulators 58aa, 58ba and between the two booster regulators 58ab, 58bb, the hydraulic circuits formed in the housing 110 become less complicated. In this way, an excessive increase in size of the housing 110 is suppressed.

In the brake hydraulic pressure controller 10 according to this embodiment, the lateral width of the housing 110 is increased, and the pump elements 40a, 40b are respectively mounted on the fifth surface 110e and the fourth surface 110d, which are located in the lateral direction (see FIG. 5). Accordingly, an axial length of each of the pump elements 40a, 40b can be increased, and a relatively large damper space can be provided in each of the pump elements 40a, 40b. Thus, the dampers (73a, 73b) that are separately provided can be omitted, and it is possible to improve an effect of suppressing pressure pulsations of the brake fluid caused by driving of the pumps 44a, 44b.

The detailed description has been made so far on the preferred embodiment of the present invention with reference to the accompanying drawings. However, the present invention is not limited to such an embodiment. It is obvious that a person who has basic knowledge in the technical field to which the present invention pertains could have easily arrived at various modification examples and correction examples that fall within the scope of the technical idea described in the claims. It is understood that those naturally fall within the technical scope of the present invention.

For example, the brake hydraulic circuit 1, which has been described in the above embodiment, includes the dampers 73a, 73b in the first hydraulic circuit 28 and the second hydraulic circuit 30, respectively. However, these dampers 73a, 73b may not be provided.

The brake hydraulic pressure controller 10, which has been described in the above embodiment, includes the second pressure sensors 26a, 26b to detect the internal pressures of the wheel cylinders. However, these second pressure sensors 26a, 26b may not be provided.

In the brake hydraulic pressure controller 10, which has been described in the above embodiment, the piping ports 121a, 121b, to which the piping connected to the master cylinder 14 is connected, and the piping ports 123a to 123d, to which the piping connected to the wheel cylinders is connected, are all formed in the third surface 110c. However, the present invention is not limited to such an example. At least one of the piping ports may be formed in another surface. For example, the piping ports 121a, 121b, to which the piping connected to the master cylinder 14 is connected, may be provided in the first surface 110a, on which the motor 96 is mounted.

REFERENCE SIGNS LIST

10: Brake hydraulic pressure controller
20: Hydraulic unit
24: First pressure sensor
26a, 26b: Second pressure sensor
34a, 34b: Suction control valve
36a, 36b: Circuit control valve
51aa, 51ba, 51ab, 51bb: Channel
54aa, 54ba, 54ab, 54bb: Pressure regulator
58aa, 58ba, 58ab, 58bb: Booster regulator
44a, 44b: Pump
96: Motor
110: Housing
110a: First surface
110b: Second surface
110c: Third surface
121a, 121b: Piping port
123a, 123b, 123c, 123d: Piping port

The invention claimed is:

1. A brake hydraulic pressure controller (10) for a four-wheeled motor vehicle and for controlling a hydraulic pressure in a brake hydraulic circuit, the brake hydraulic pressure controller (10) comprising:
a housing (110);
a motor (96) mounted on a first surface (110a) of the housing (110); and
plural electromagnetic control valves (34a, 34b, 46a, 36b, 54aa, 54ba, 54ab, 54bb, 58aa, 58ba, 58ab, 58bb) mounted on a second surface (110b) that opposes the first surface (110a) of the housing (110), wherein
the plural electromagnetic control valves (34a, 34b, 36a, 36b, 54aa, 54ba, 54ab, 54bb, 58aa, 58ba, 58ab, 58bb) are arranged in plural rows (L1, L2, L3) from a near side to a far side from a third surface (110c) that continues perpendicularly from both of the first surface (110a) and the second surface (110b), and
the plural electromagnetic control valves include two circuit control valves (36a, 36b) and four booster regulators (58aa, 58ba, 58ab, 58bb), which are arranged in the same row, the two circuit control valves (36a, 36b) being arranged in channels (33a, 33b) that connect piping ports (121a, 121b), to which piping connected to a master cylinder is connected, and discharge sides of pumps (44a, 44b) driven by the motor (96), and the four booster regulators (58aa, 58ba, 58ab, 58bb) being arranged in channels (51aa, 51ba, 5 lab, 51bb) that connect the circuit control valves (36a, 36b) and piping ports (123a, 123b, 123c, 123d), to which piping connected to wheel cylinders is connected.

2. The brake hydraulic pressure controller (10) according to claim 1, wherein
one of the two circuit control valves (36a or 36b) is arranged between two of the four booster regulators (58aa, 58ba or 58ab, 58bb).

3. The brake hydraulic pressure controller (10) according to claim 1, wherein
on the second surface (110b), the plural electromagnetic control valves (34a, 34b, 46a, 36b, 54aa, 54ba, 54ab, 54bb, 58aa, 58ba, 58ab, 58bb) are arranged in three rows from the near side to the far side from the third surface (110c),
the two circuit control valves (36a, 36b) and the four booster regulators (58aa, 58ba, 58ab, 58bb) are arranged in a first row (L1),
the plural electromagnetic control valves include suction control valves (34a, 34b) which are arranged in channels (31a, 31b) that connect the piping ports (121a, 121b) and suction sides of the pumps (44a, 44b) and which are arranged in a second row (L2), and
the plural electromagnetic control valves include four pressure regulators (54aa, 54ba, 54ab, 54bb) which are arranged in channels (53aa, 53ba, 53ab, 53bb) that connect the suction sides of the pumps (44a, 44b) and the piping ports (123a, 123b, 123c, 123d) and which are arranged in a third row (L3).

4. The brake hydraulic pressure controller (10) according to claim 3 further comprising:
at least one pressure sensor (24, 26a, 26b) mounted on the second surface (110b), wherein
the pressure sensor (24, 26a, 26b) is arranged in a different row (L2, L3) from the row (L1) in which the two circuit control valves (36a, 36b) and the four booster regulators (58aa, 58ba, 58ab, 58bb) are arranged.

5. The brake hydraulic pressure controller (10) according to claim 4, wherein
the pressure sensors (24, 26*a*, 26*b*) include: a first pressure sensor (24) that detects an internal pressure of the master cylinder; and two second pressure sensors (26*a*, 26*b*), each of which detects an internal pressure of the wheel cylinder,
the first pressure sensor (24) is arranged with the two suction control valves (34*a*, 34*b*) in the second row (L2), and
the two second pressure sensors (26*a*, 26*b*) are arranged with the four pressure regulators (54*aa*, 54*ba*, 54*ab*, 54*bb*) in the third row (L3).

6. The brake hydraulic pressure controller (10) according to claim 5, wherein
the third surface (110*c*) is formed with at least one of the piping ports (121*a*, 121*b*), to which the piping connected to the master cylinder is connected, and the piping ports (123*a*, 123*b*, 123*c*, 123*d*), to which the piping connected to the wheel cylinders is connected.

7. The brake hydraulic pressure controller (10) according to claim 1, wherein
the third surface (110*c*) is formed with at least one of the piping ports (121*a*, 121*b*), to which the piping connected to the master cylinder is connected, and the piping ports (123*a*, 123*b*, 123*c*, 123*d*), to which the piping connected to the wheel cylinders is connected.

8. The brake hydraulic pressure controller (10) according to claim 2, wherein
on the second surface (110*b*), the plural electromagnetic control valves (34*a*, 34*b*, 46*a*, 36*b*, 54*aa*, 54*ba*, 54*ab*, 54*bb*, 58*aa*, 58*ba*, 58*ab*, 58*bb*) are arranged in three rows from the near side to the far side from the third surface (110*c*),
the two circuit control valves (36*a*, 36*b*) and the four booster regulators (58*aa*, 58*ba*, 58*ab*, 58*bb*) are arranged in a first row (L1),
the plural electromagnetic control valves include suction control valves (34*a*, 34*b*) which are arranged in channels (31*a*, 31*b*) that connect the piping ports (121*a*, 121*b*) and suction sides of the pumps (44*a*, 44*b*) and which are arranged in a second row (L2), and
the plural electromagnetic control valves include four pressure regulators (54*aa*, 54*ba*, 54*ab*, 54*bb*) which are arranged in channels (53*aa*, 53*ba*, 53*ab*, 53*bb*) that connect the suction sides of the pumps (44*a*, 44*b*) and the piping ports (123*a*, 123*b*, 123*c*, 123*d*) and which are arranged in a third row (L3).

9. The brake hydraulic pressure controller (10) according to claim 8 further comprising:
at least one pressure sensor (24, 26*a*, 26*b*) mounted on the second surface (110*b*), wherein
the pressure sensor (24, 26*a*, 26*b*) is arranged in a different row (L2, L3) from the row (L1) in which the two circuit control valves (36*a*, 36*b*) and the four booster regulators (58*aa*, 58*ba*, 58*ab*, 58*bb*) are arranged.

10. The brake hydraulic pressure controller (10) according to claim 9, wherein
the pressure sensors (24, 26*a*, 26*b*) include: a first pressure sensor (24) that detects an internal pressure of the master cylinder; and two second pressure sensors (26*a*, 26*b*), each of which detects an internal pressure of the wheel cylinder,
the first pressure sensor (24) is arranged with the two suction control valves (34*a*, 34*b*) in the second row (L2), and
the two second pressure sensors (26*a*, 26*b*) are arranged with the four pressure regulators (54*aa*, 54*ba*, 54*ab*, 54*bb*) in the third row (L3).

11. The brake hydraulic pressure controller (10) according to claim 10, wherein
the third surface (110*c*) is formed with at least one of the piping ports (121*a*, 121*b*), to which the piping connected to the master cylinder is connected, and the piping ports (123*a*, 123*b*, 123*c*, 123*d*), to which the piping connected to the wheel cylinders is connected.

12. The brake hydraulic pressure controller (10) according to claim 2, wherein
the other of the two circuit control valves (36*a* or 36*b*) is arranged between the other two of the four booster regulators (58*aa*, 58*ba* or 58*ab*, 58*bb*).

* * * * *